United States Patent

[11] 3,583,718

| | | |
|---|---|---|
| [72] | Inventor | Vernis Henry Meyer<br>Granger, Iowa |
| [21] | Appl. No. | 853,344 |
| [22] | Filed | Aug. 27, 1969 |
| [45] | Patented | June 8, 1971 |
| [73] | Assignee | Deere & Company<br>Moline, Ill. |

[54] TANK-MOUNTING ATTACHMENT FOR AGRICULTURAL TRACTOR
10 Claims, 3 Drawing Figs.

[52] U.S. Cl. .................................................. 280/5,
 280/179, 280/150
[51] Int. Cl. ............................................... B60p 7/00
[50] Field of Search .......................................... 280/5, 179,
 186, 150, 203, 202; 172/272, 273, 274

[56] References Cited
UNITED STATES PATENTS

| 3,396,983 | 8/1968 | Massey et al. | 280/5 |
| 3,488,061 | 1/1970 | Hansen et al. | 280/5(A) |

*Primary Examiner*—Benjamin Hersh
*Assistant Examiner*—John P. Silverstrim
*Attorneys*—H. Vincent Harsha, Harold M. Knoth, William A. Murray, John M. Nolan and R. L. Hollister

ABSTRACT: An attachment for mounting a pair of sprayer solution tanks on an agricultural tractor, one tank on each side of the tractor ahead of the rear wheels. Each of the tanks are supported by a cradle assembly mounted on a socket which is adapted to be positioned over the end of a transversely extending toolbar suspended beneath the tractor frame.

PATENTED JUN 8 1971  3,583,718

*INVENTOR.*
VERNIS HENRY MEYER 3,583,718

TANK-MOUNTING ATTACHMENT FOR AGRICULTURAL TRACTOR

BACKGROUND OF THE INVENTION

The present invention relates generally to agricultural sprayers, and more particularly relates to an attachment for mounting a pair of sprayer solution tanks on the sides of an agricultural tractor.

In the past, the tanks for most agricultural sprayers have been mounted on a trailer pulled behind a tractor and used in conjunction with a sprayer boom on the tractor or the trailer. The trailer-mounted solution tanks have been satisfactory as long as the only function being performed was that of applying a liquid chemical such as a herbicide or pesticide. However, in recent years, it has become common practice to combine the spraying function with an earth-working function such as applying pre-emergence spray behind a planter. In the situation where the earth-working implement such as a planter, is mounted to the rear of the tractor, it is no longer feasible to pull a trailer-mounted solution tank behind the tractor. Also, in many instances, when the only function being performed is that of spraying, it is desirable to supplement the capacity of the trailer-mounted solution tank.

To fill the voids left by the trailer-mounted solution tanks, the tanks have been mounted on the sides of a tractor intermediate the front and rear wheels. However, prior to the present invention, all of the attachments for mounting solution tanks to the sides of a tractor had some disadvantage such as requiring considerable work in securing the attachment to the tractor, not being able to support tanks of sufficient capacity, and obstructing the tractor operator's forward view.

SUMMARY OF THE INVENTION

It is the principle object of the invention to overcome the disadvantages of the prior art attachments for mounting sprayer solution tanks to the sides of agricultural tractors. To this end, the tank-mounting attachment according to the present invention utilizes a transversely extending toolbar which is suspended beneath the tractor by the tractor side frame members, and right- and left-hand subframes which carry the tanks are in turn mounted on the ends of the toolbar. Each of the subframes includes a tank-carrying cradle mounted on top of a socket member which can be positioned over one end of the toolbar. Each of the cradles is also provided with a bracket which is securable to the tractor side frame members to prevent accidental displacement of the socket member from the toolbar and to lend stability to the subframe.

A further object of the present invention is to provide an attachment for mounting sprayer solution tanks on a tractor which is strong, yet compact and light in weight, which is extremely simple in design, which does not obstruct the forward view of the tractor operator, which is easily attached to the frame of the tractor, and which is adjustable to fit various sizes and types of agricultural tractors.

The above and additional objects and advantages of the present invention will become apparent along with the details of construction of a preferred embodiment of the invention from a reading of the following detailed description when taken in conjunction with the accompanying drawing.

DESCRIPTION OF THE PREFERRED EMBODIMENT

Figure 1:
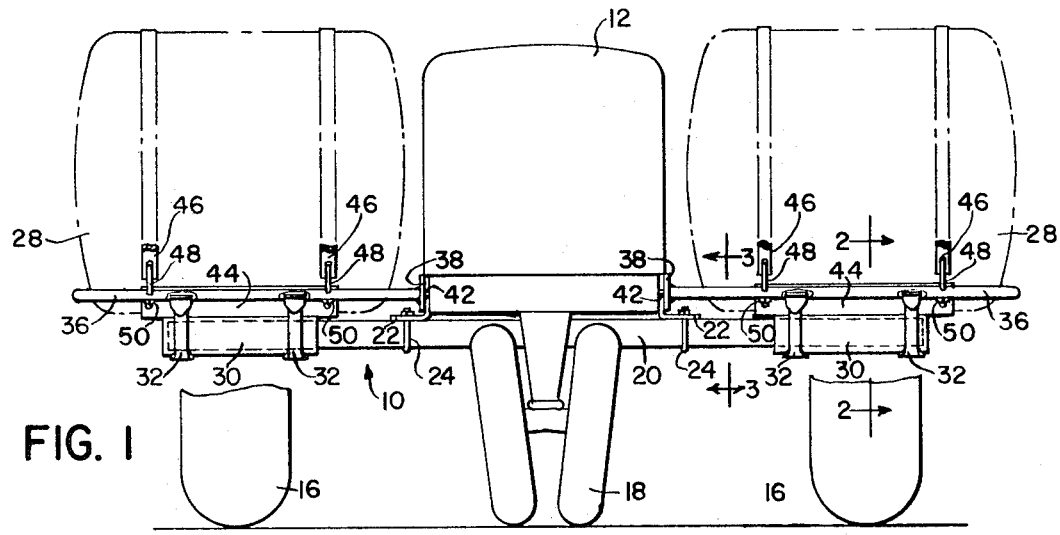
FIG. 1 is a front elevational view of a sprayer solution tank-mounting attachment according to the present invention mounted on an agricultural tractor.
Figure 2:
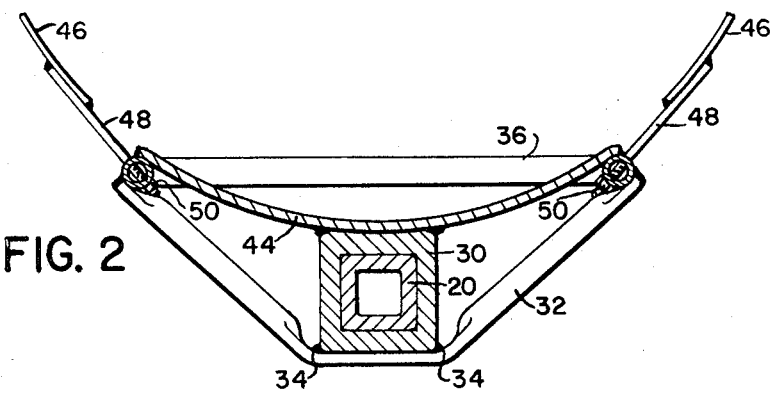
FIG. 2 is an enlarged sectional view taken substantially along the lines 2–2 of FIG. 1.
Figure 3:
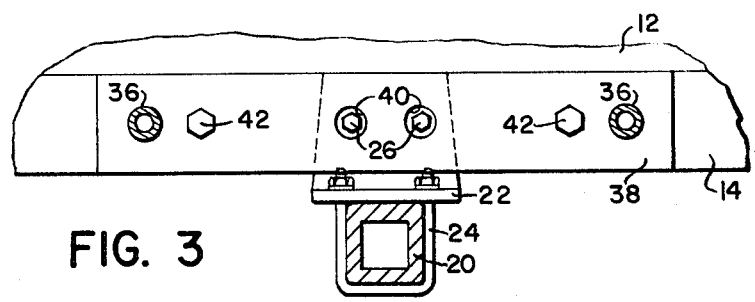
FIG. 3 is an enlarged sectional view taken substantially along the lines 3–3 of FIG. 1.

Referring now to the drawing, a preferred embodiment of the sprayer solution tank-mounting attachment is indicated generally at 10 and is illustrated as being mounted on a conventional agricultural tractor 12 which has a main frame including right- and left-side frame members 14 (FIG. 2) carried by rear traction wheels 16 and front steerable wheels 18. The attachment includes an elongated transversely extending toolbar 20 which is suspended beneath the tractor frame intermediate the front and rear wheels by a pair of spaced right angle brackets 22. The brackets 22 have horizontal legs which are releasably secured to the top of the toolbar 20 by U-bolts 24 and vertical legs which are secured to the side frame members by a plurality of bolts 26 which extend through both the vertical legs of the brackets 22 and the side frame members 14.

The solution tanks 28 are mounted on the opposite ends of the toolbar 20 by a pair of subframes, each of which includes a socket member 30 which is slid over one end of the toolbar 20. The toolbar and socket members are of corresponding rectangular construction so that the socket members are prevented from any rotational movement on the toolbar. A pair of tubular brace members 32 are mounted on each of the socket members 30. To this end, each of the brace members 32 is flattened medially its ends and welded to the bottom of the socket 30 as at 34. The opposite ends of the brace members 32 extend upwardly and outwardly to positions spaced above and to the sides of the socket members 30. A generally U-shaped frame member 36 has its legs welded to the upper ends of the brace members 32 on each of the socket members 30 so that the U-shaped frame members 36 is carried by the brace members 32. The free ends of the legs of each of the U-shaped frame members 36 are welded to and interconnected by an elongated flat bracket or mounting plate 38. Each of the mounting plates 38 is provided with a plurality of apertures 40 which receive the heads of the bolts 26 so that the plates 38 can abut against the vertical legs of the right-angle brackets 22. The mounting plates 38 are releasably secured to the tractor side frame members 14 by bolts 42 which extend through the plates 38 and the side frame members 14. The connection between the mounting plates 38 and the tractor side frame members 14 prevents accidental removal of the socket members 30 from the ends of the toolbar 20 and also lends stability to the subframes.

An elongated transversely arcuate and upwardly open tank-supporting plate or cradle member 44 is mounted on top of each socket member 30. To rigidly mount the tank-supporting plates 44, the sides of each of the plates 44 is welded to the legs of one of the U-shaped frame members 36 and an intermediate portion of each plate is welded to the top surface of one of the socket members 30. The tanks 28 are carried in the cradles 44, and each tank is retained in its respective cradle by a pair of flexible straps 46. The ends of the straps 46 are anchored to the legs of the U-shaped frame members 36 by threaded rods 48 which extend through suitable apertures provided in the legs of the U-shaped frame members 36 and by nuts 50 threaded onto the ends of the rods 48 and engaging the legs of the U-shaped frame members 36. By tightening the nuts 50, the effective length of the straps 46 can be varied to firmly retain the tanks 28 in their respective cradles 44.

From the foregoing description, the method of connecting the solution tank-mounting attachment on the tractor should be quite apparent. The toolbar is first suspended from the tractor frame by securing the vertical legs of the right-angle brackets 22 to the tractor side frame members 14 with bolts 26. The socket members 30 are then slid over the ends of the toolbar 20 and secured thereon by connecting the mounting plates 38 to the tractor side frame members 14 with bolts 42. After this simple procedure, the side tanks are ready for use.

It should be noted that the above-described tank-mounting attachment can be used with tractors of various sizes. For example, if the attachment is to be mounted on a tractor larger than that disclosed, it is only necessary to reposition the right-angle brackets 22 by loosening the U-bolts 24. The socket members 30 are then slid onto the ends of the toolbar 20 only a sufficient distance so that the mounting plates 38 abut against the vertical legs of the right-angle brackets 22.

It should be obvious from an inspection of the drawing and from the foregoing description that the tanks 28 and the tank-mounting attachment does not interfere with the forward view of the tractor operator since there is no structure extending across the tractor hood, that the large toolbar 20 provides sufficient support for large capacity tanks and that the entire attachment is easily mounted on any size tractor.

While only a single preferred embodiment of the invention has been described and illustrated, various modifications within the spirit and scope of the invention would be well apparent to those skilled in the art, and can be made without departing from the underlying principles of the invention.

I claim:

1. An attachment for mounting a pair of tanks along the sides of a tractor having a pair of side frame members, the apparatus comprising: an elongated toolbar; a pair of brackets mounted on the toolbar and releasably secured to the side frame members for suspending the toolbar beneath the tractor in transverse relation thereto; and a pair of tank-mounting subframes each including a socket member removably positioned over one end of the toolbar, a plurality of spaced brace means extending upwardly and outwardly from the sides of the socket member, a U-shaped member having its legs secured to the brace member and extending toward the tractor side frame member, plate means interconnecting the ends of the legs of the U-shaped member and releasably secured to the tractor side frame member, and an elongated transversely arcuate cradle member having its sides secured to the legs of the U-shaped member and an intermediate portion secured to the top of the socket member.

2. The apparatus set forth in claim 1 wherein the toolbar is of rectangular construction and the socket members are of rectangular construction whereby the socket members are prevented from rotation on the toolbars and the cradle members are maintained in an upright position.

3. The apparatus set forth in claim 2 wherein the plurality of brace means on each of the socket members include a pair of spaced inner and outer brace members secured intermediate their ends to the bottom of the socket member and have their outer ends extending upwardly and outwardly in opposite directions from the bottom of the socket member.

4. The apparatus set forth in claim 1 wherein a pair of flexible straps have their opposite ends anchored to the legs of each of the U-shaped members, the straps being adjustable in length and adapted to firmly secure a tank within each of the cradle members.

5. The apparatus set forth in claim 4 wherein the legs of the U-shaped members are provided with a plurality of apertures, at least one end of each of the flexible straps is provided with a threaded rod which extends through one of the apertures, and nut means on the end of the threaded rods serve to vary the length of the flexible straps.

6. In combination, a tractor having a pair of side frame members and front and rear wheels, an elongated transversely extending toolbar suspended from the side frame members intermediate the front and rear wheels, a socket member positioned over each end of the toolbar, an elongated cradle member carried by each socket member and extending generally parallel thereto, means for releasably securing the cradle to the tractor side frame members to prevent accidental removal of the socket members from over the ends of the toolbar, a tank carried by each cradle, and means for securing the tanks within the cradles.

7. The combination set forth in claim 6 wherein a plurality of brace means extend upwardly and outwardly from each side of the socket members, an elongated side bar is secured to the outer ends of the brace means on each side of each socket member, each of the side bars extend generally parallel to and is positioned above and to one side of one of the socket members, and each of the cradle members includes an elongated transversely arcuate and upwardly open tank-supporting plate which has its sides secured to a pair of said side bars and an intermediate portion secured to the top of the corresponding socket member.

8. The combination set forth in claim 7 wherein the means for releasably securing the cradle members to the tractor side frame members includes bracket means secured to and interconnecting the inner ends of each pair of side bars, and each of the bracket means is releasably secured to one of the tractor side frame members.

9. The combination set forth in claim 8 wherein the means for releasably securing the tanks within the cradles includes a pair of flexible straps for each tank, the straps having their ends anchored to the side bars, and at least one end of each strap is adjustably anchored to afford adjustment in the effective length of the straps.

10. In combination, a tractor having front and rear wheels and a main frame including a pair of side frame members, an elongated transversely extending toolbar positioned beneath the tractor main frame intermediate the front and rear wheels, a pair of spaced right-angle brackets each having a horizontal leg secured to the toolbar and a vertical leg extending upwardly alongside one of the side frame members, bolt means extending through the vertical legs of the brackets and the side frame members to releasably secure the brackets to the side frame members whereby the toolbar is suspended from the tractor main frame, a socket member positioned over each end of the toolbar, a plurality of brace members extending upwardly and outwardly from each side of the socket members, an elongated side bar secured to the outer ends of the brace members on each side of each socket member and extending generally parallel to the toolbar, an elongated flat bracket secured to and interconnecting the inner ends of each pair of side bars and positioned adjacent the vertical legs of the right-angle brackets, a plurality of apertures provided in each of the flat brackets positioned to receive the heads of the bolt means securing the right-angle brackets to the side frame members whereby the flat brackets can abut against the vertical legs of the right-angle brackets, additional bolt means extending through the flat brackets and side frame members to releasably secure the flat brackets to the side frame members, a pair of elongated transversely arcuate cradle members each having its sides secured to a pair of the side bars and an intermediate portion secured to the top of the corresponding socket member, a tank positioned in each cradle member, and means for releasably securing each tank in its respective cradle member.